US005644812A

United States Patent [19]
Neufeldt et al.

[11] Patent Number: 5,644,812
[45] Date of Patent: Jul. 8, 1997

[54] ADJUSTABLE DOCK APPARATUS

[75] Inventors: Roy E. Neufeldt; Clint J. Retterath, both of Red Wing, Minn.

[73] Assignee: Neufeldt Industrial Services, Inc., Red Wing, Minn.

[21] Appl. No.: 548,731

[22] Filed: Oct. 26, 1995

[51] Int. Cl.$^6$ ............................................. E01D 1/00
[52] U.S. Cl. ................................................ 14/71.3
[58] Field of Search ............................. 14/69.5, 71.1, 14/71.3, 71.7

[56] References Cited

U.S. PATENT DOCUMENTS

| | | | |
|---|---|---|---|
| 2,639,450 | 5/1953 | Ramer | 14/71 |
| 2,689,965 | 9/1954 | Fenton | 14/71 |
| 3,179,968 | 4/1965 | Lambert | 14/71 |
| 4,551,877 | 11/1985 | Alten | 14/71.7 |
| 4,727,613 | 3/1988 | Alten | 14/71.1 |
| 4,862,547 | 9/1989 | Alten | 14/71.1 |
| 5,068,938 | 12/1991 | Roscoe | 14/71.7 |
| 5,257,431 | 11/1993 | Larson et al. | 14/71.5 |
| 5,481,773 | 1/1996 | Alten | 14/69.5 |

*Primary Examiner*—James A. Lisehora
*Attorney, Agent, or Firm*—Nawrocki, Rooney & Sivertson, P.A.

[57] ABSTRACT

This adjustable dock apparatus uses a planar body pivotally attached to the edge of a dock and horizontal movement of a planar extension slideably attached to and coplanar with the body to close the space between a truck trailer and the dock. A first set of power driven actuators rotate the body between vertical and horizontal, and a second set of actuators moves the extension. Inductive spaced apart sensors on the extension outer edge detects the trailer and stops the bracketing second actuators when a predetermined distance from the trailer to space the extension and trailer and match the angle between them.

6 Claims, 9 Drawing Sheets

ADJUSTABLE DOCK APPARATUS

FIELD OF THE INVENTION

This invention relates to an improvement in dock apparatus for loading truck trailers. More particularly, this invention relates to apparatus which closes the gap between a dock and a truck trailer to a predetermined distance using both rotation and extension.

DESCRIPTION OF THE PRIOR ART

Various loading dock apparatus address the problem of closing the gap between a loading dock and a vehicle.

Fenton, U.S. Pat. No. 2,689,965 has an extensible and adjustable dock board operated by a cylinder to raise and extend the board over an adjacent dock. Ralmer, U.S. Pat. No. 2,639,450 uses a cylinder to elevate and move the forward edge of a pivotabaly connected ramp plate over a dock. Alten, U.S. Pat. No. 4,551,877 uses a cylinder to slide a pivotally mounted bridge plate over a platform for rest and support.

Larson et al., U.S. Pat. No. 5,257,431 has an array of proximity sensors mounted adjacent to the front bumper of a loading bridge opposite an airplane. The proximity sensors are interconnected to circuitry which reduces the speed of approach of the gangway carrying this apparatus to an airplane and which automatically controls angular misalignment of the gangway relative to the airplane. Roscoe, U.S. Pat. No. 5,068,938 has a movable loading platform in which an upper horizontal panel is slidably attached to a dock by a series of plates having elongated channels and pneumatic cylinders with a control circuit for advancing the platform into a flush relationship to the side of a vehicle.

Lambert, U.S. Pat. No. 3,179,968 uses a power-operated loading ramp which can tilt from side to side to accommodate misalignment between the surfaces of the dock and truck bed. Alten, U.S. Pat. No. 4,727,613 has a pivotable bridge plate and an extension that can be moved back and forth relative to the bridge plate for resetting the bridge plate on a platform to be loaded or unloaded.

None of these teach the use of a powered apparatus which first rotates a body from vertical to horizontal to close the distance from a dock to a trailer from feet to inches, and then extends a powered slideable extension from the body to close this distance from inches to a fraction of an inch, and also incline the extension to match the angle of the trailer measured and controlled by sensors.

SUMMARY OF THE INVENTION

This adjustable dock apparatus uses a combination of rotation of a planar body and horizontal movement of an extension, mounted under and coplanar with the body, to close the space between a truck trailer and a dock.

The truck trailer is first parked with one side parallel and a known distance from a dock. This parking can be assisted by an optional pair of stops mounted on the ground. The stops position the trailer tires and attached trailer parallel to the dock at a known distance.

The apparatus has a planar rectangular shaped body with a width of several feet and a length equal to the length of the dock, which is hinged to a mount attached to the upper edge of the dock. A first set of power driven actuators, connected between the side of the dock and the body, rotates the body between a vertical orientation upward from the dock and a horizontal orientation outward from the dock. When the body is horizontal, the outer edge will reach to within a few inches of the side of a trailer parked parallel to the dock, which can also be positioned by the pair of stops, as mentioned earlier.

An extension is slidably attached along the outside edge of and coplanar with the body. The extension can be retracted to totally overlap the body or can be extended outward several inches. An ultra high molecular weight (UHMW) plastic sheet between the extension and the body minimizes sliding friction and ensures long operational life.

With the truck trailer parked parallel to the dock and the tires nearest the dock next to the pair of stops, the distance the extension can be extended from the retracted position is adequate to extend the outside edge of the extension slightly beyond the adjacent side of the trailer.

A second set of power driven actuators, connected between the body and the extension, drives the extension relative to the body. All of the actuators operate at essentially the same speed, which results in the outside edge of the extension remaining essentially parallel with the outside edge of the body when driven by the second set of power actuators. Three inductive sensors, mounted on the outside edge of the extension and spaced along its edge, detect the metal in the trailer at approximately one fourth of an inch. The actuators are divided into three groups of essentially equal numbers which bracket each inductive sensor. When the extension is moving outward only, a signal from any one of these inductive sensors will stop the bracketing group of actuators with the outside edge of the extension approximately one fourth of an inch from the side of the trailer. The remaining actuators will continue to operate until the inductive sensor signal for their respective bracketing group is received at which time they also stop. Dividing the actuators into three groups which bracket each controlling inductive sensor provides a means for inclining the edge of the dock relative to the trailer to compensate for any trailer misalignment with the dock. Since the stops have nearly aligned the trailer with respect to the dock, and since the extension outside edge has been driven outward and inclined to match the outside edge of the body by the above process, all parts of the edge of the extension will then be close enough to the side of the trailer to prevent a person from extending a hand or foot between them.

The actuators all have limit switches which interrupt power to the actuators at their limits. In the event that the limit switches become inoperative, a time-out will deenergize the actuators after a predetermined length of time.

When a trailer is parked parallel to the dock at the distance determined by the stops, the adjustable dock apparatus is then used to close the distance between the dock and the trailer.

A controller with two three-position center-off toggle switches controls the actuators. A third push button locking switch provides an emergency switch to stop all operations when pushed inward. When pushed inward, this push button switch remains in the inward stop position until pushed a second time, which releases the switch to the operating condition. The controller is located on the dock proper to permit the operator to observe any potential obstructions prior to and during operation. The controller is connected to a conventional 110 volt ac power source which provides power for all of the actuators and sensors.

The first center-off toggle switch has a first position which causes the first set of actuators to rotate the body from a vertical orientation to a horizontal orientation, and a second position which causes the actuators to rotate the body from a horizontal orientation to a vertical orientation. The rotation of the body is slow enough to readily be monitored by the operator under manual control. After the body has rotated fully to either the horizontal or the vertical orientation, the limit switches of the first set of actuators stops the actuators with the body at one of these respective orientations.

The second center-off toggle switch has a first position which causes the second set of actuators to move the extension outward and a second position which causes the actuators to move the extension inward. Here too, the movement of the extension is slow enough to readily be monitored by the operator. During retraction, after the body has retracted fully under the body, the limit switches of the second set of actuators will stop the retraction of the extension at this position. During extension, the three groups of second actuators will extend the extension outward until the inductive sensor for that particular bracketing group senses the outer edge of the trailer which causes power to be removed for that group of actuators. This process continues until all three groups of second actuators have their power removed, as described earlier.

When the extension is completely retracted under the body and the body is rotated from a horizontal orientation to a vertical orientation, this position is called the parked position. This is the position of the extension and body between uses.

A light mounted above on one end of the dock is aligned with a light detector on the opposite end of the dock to detect anything intercepting the light path. This light path coincides with the parked body position but is located above the middle of the body. The operating sequence is stopped whenever anything intercepts this light path.

All of the actuators use an electric motor operating from a conventional 110 volt ac power source to rotate a screw drive. The screw drive extends or retracts a rod which operates the apparatus. A screw drive provides a slow movement of the body and extension to allow adequate time for an individual to evade their motion. The extension also has a rubber bumper along the outer edge as an extra safety feature. In the unlikely event that anyone has any part of their body between the truck and the extension as the gap closes, the rubber bumper will yield enough to prevent an injury. An emergency switch is also provided which immediately stops all operations of the apparatus.

DESCRIPTION OF THE PREFERRED EMBODIMENT

The deployment of adjustable dock apparatus 10 with body 12 and extension 16 horizontal with respect to dock 14 is shown in FIGS. 1, 2, 4 and 6A. Adjustable dock apparatus 10 has a body 12 pivotally attached to a right angle mount 13 which is attached to the upper outside edge of dock 14. This permits body 12 to pivot between the horizontal orientation shown in the above figures and the vertical orientation shown in FIGS. 3, 5 and 6.

Truck trailer 18 is positioned a known distance from dock 14 with a side parallel by two stops 19 which allow the tires on each end of trailer 18 to approach dock 14 within a known distance. This also aligns the side of trailer 18 parallel with dock 14. Stops 19 provide a known predetermined distance from the edge of dock 14 and the side of trailer 18 for the adjustable dock apparatus 10 to bridge, which permits sizing the apparatus for that particular distance.

Figure 7:
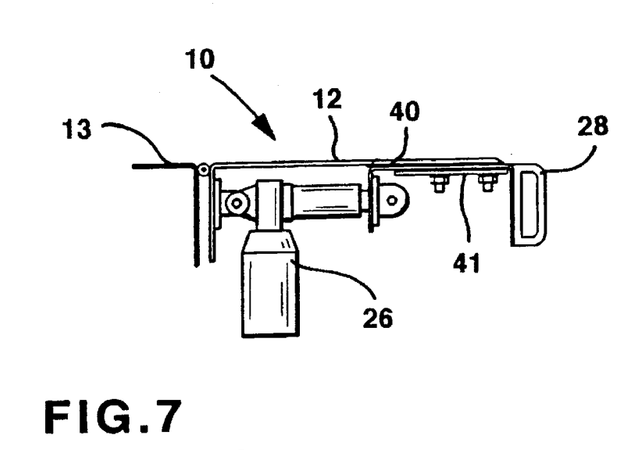
FIG. 7 is a side view of the apparatus only showing the second actuators with the extension withdrawn.
Figure 7A:
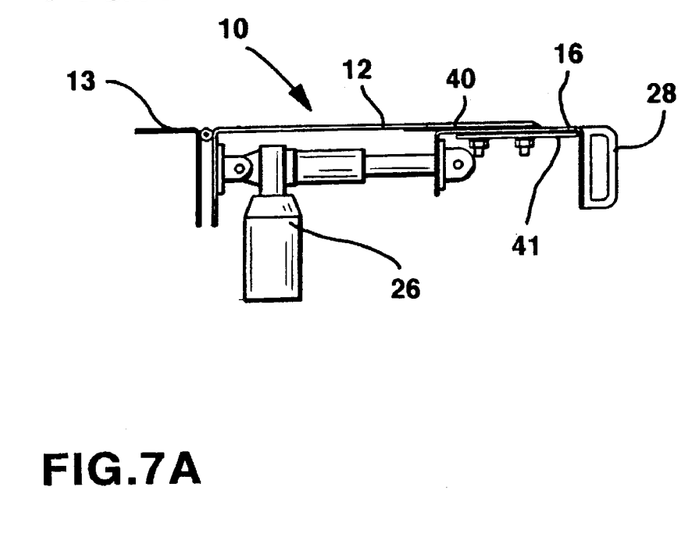
FIG. 7A is the view of FIG. 7 with the extension extended.
Figure 7B:
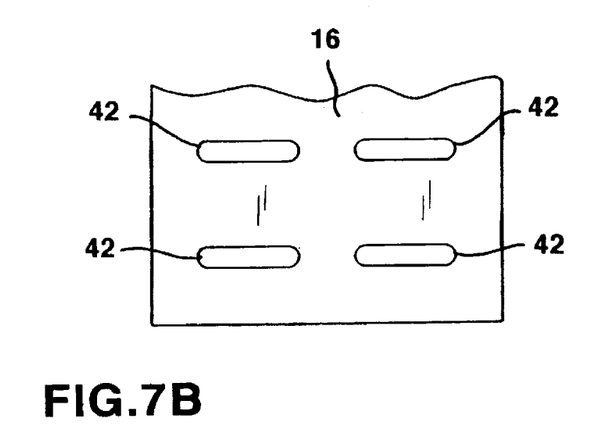
FIG. 7B is an end portion of the plastic sheet.
Figure 7C:
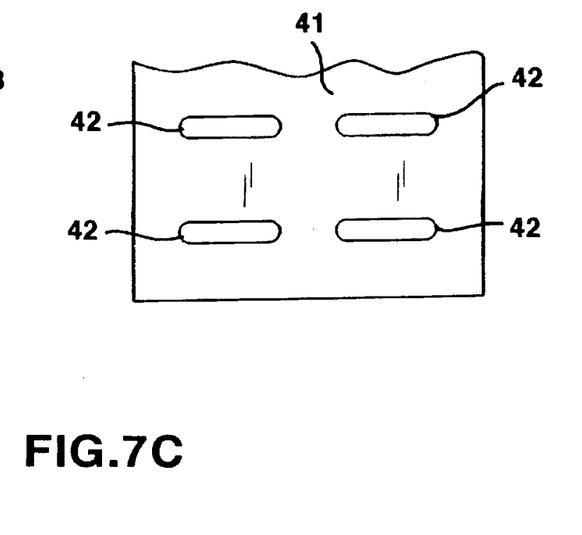
FIG. 7C is an end portion of the backing plate.

Extension 16 is slideably mounted parallel to and on body 12, as shown in detail in FIGS. 7, 7A, 7B and 7C, using an ultra high molecular weight (UHMW) plastic sheet 40, or equivalent, with the sheet sandwiched between body 12 and extension 16. Plastic sheet 40 minimizes sliding friction and ensure long operational life. This plastic combines strength and wear resistance with low friction. Slots 42 in extension 16 shown in FIG. 7B, and in backing plate 41 shown in FIG. 7C, provide access for four bolts, secured by matching nuts, which extend from body 16 through these slots and through holes in plastic sheet 40 for the fastening means. This permits sliding extension 16 between the position shown in FIG. 7 and the position shown in FIG. 7A. When extension 16 is positioned as shown in FIG. 7, this corresponds to the position of the extension in FIG. 1, and when the extension is positioned as shown in FIG. 7A, this corresponds to the position of the extension in FIG. 2. This arrangement provides great supporting strength while still permitting extension 16 to slide with respect to body 12. Other arrangements are possible but will involve greater complexity and cost and since the weight of the extension across a dock is quite large additional complexity will involve considerable additional cost.

Figure 5:
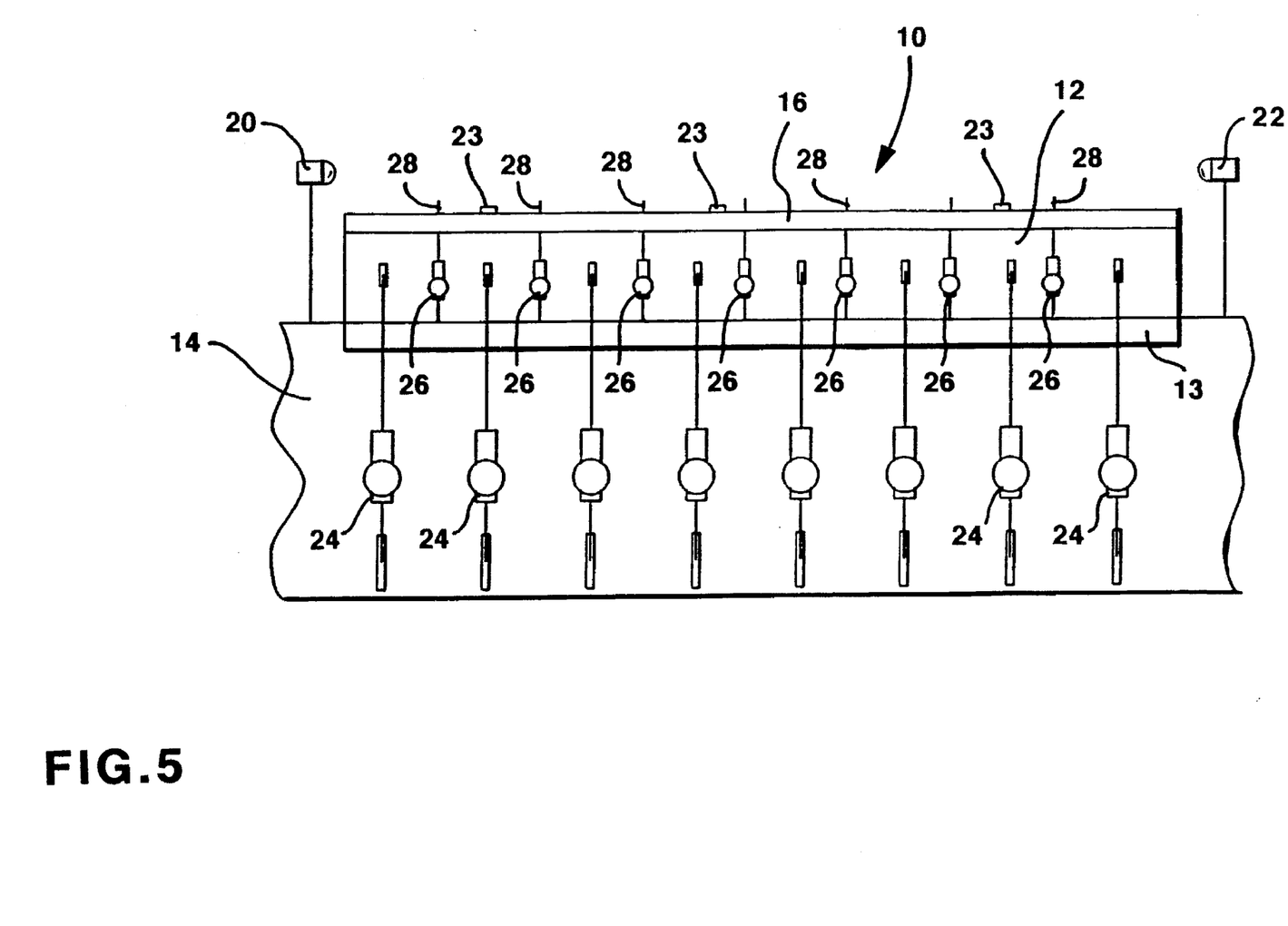
FIG. 5 is the view of FIG. 4 with the body vertical.
Figure 6:
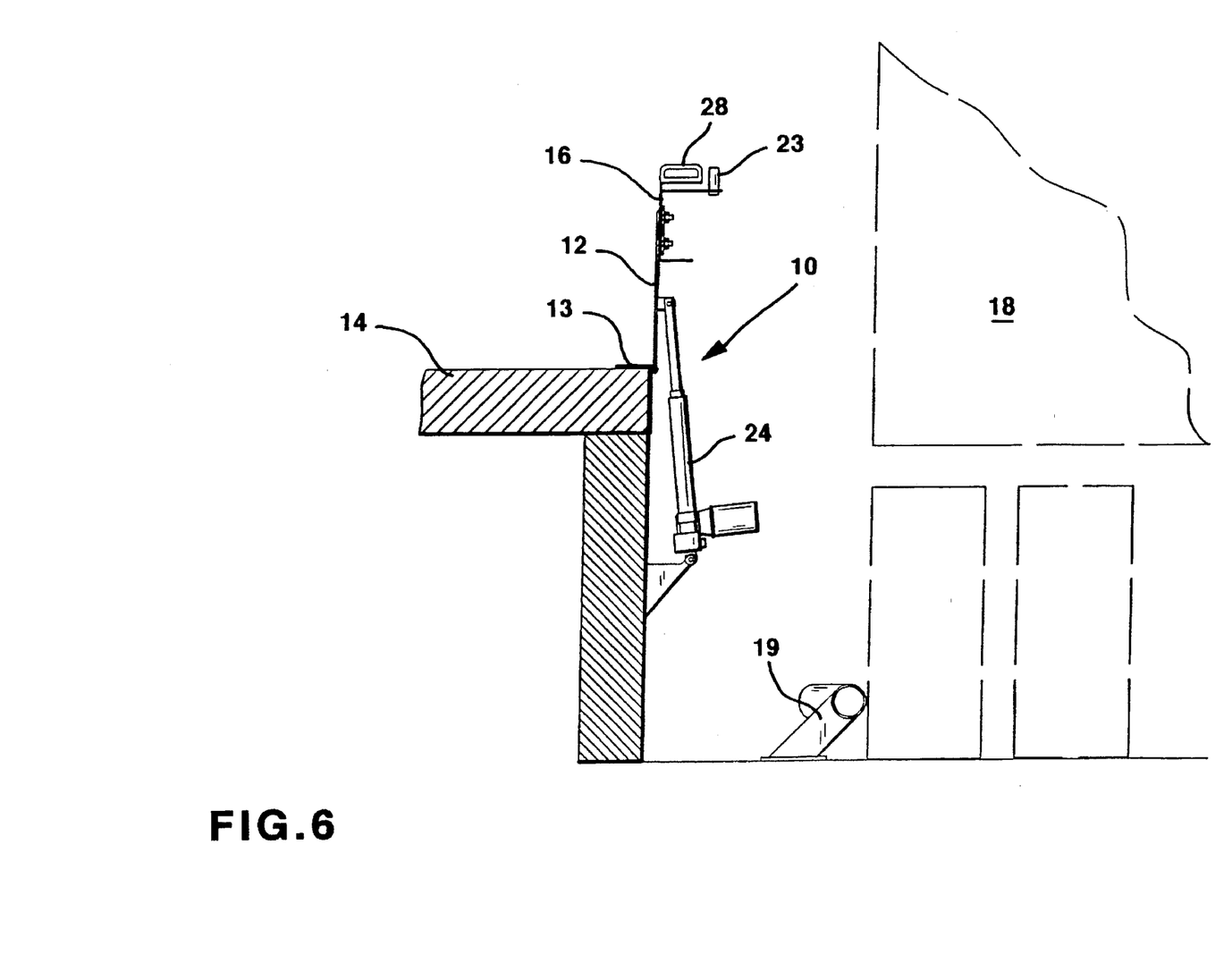
FIG. 6 is an end view of the apparatus mounted on a dock with the body vertical with a stop next to the dock, and with a trailer shown in dashed outline parked next to the dock.

Extension 16 is driven by second actuators 26 which extend or retract a rod to move the extension outward or inward. These actuators can be the Mini-Pac electro mechanical actuators 6905 Series of Duff-Norton with built in limit switches which operate from 110 volts ac, or an equivalent. These use an enclosed, permanent split capacitor induction motor which has load/no load speeds which are approximately equal. Each motor has thermal time-out apparatus which opens and resets automatically. A gear driven by the motor extends or retracts a rod depending upon the direction of motor rotation. Seven such second actuators 26 are shown in FIG. 5. Two second actuators 26 on each end constitute two groups of actuators and the central three second actuators constitute a group of actuators. Second actuators 26 are controlled as bracketing groups as will be described later.

A light source 20 is mounted above one end of dock 14 and a light detector 22 is mounted above the opposite end. The light path is above the dock down the middle, and is not interrupted by body 12 in a vertical orientation. Light detector 22 can be the Valu-Beam 912 series of sensor, or an equivalent. These sensors are totally encapsulated, are switch selectable to operate in light or dark environments and have adjustable sensitivity. Appropriate electronics is provided as a part of this sensor 22 series.

Figure 1:
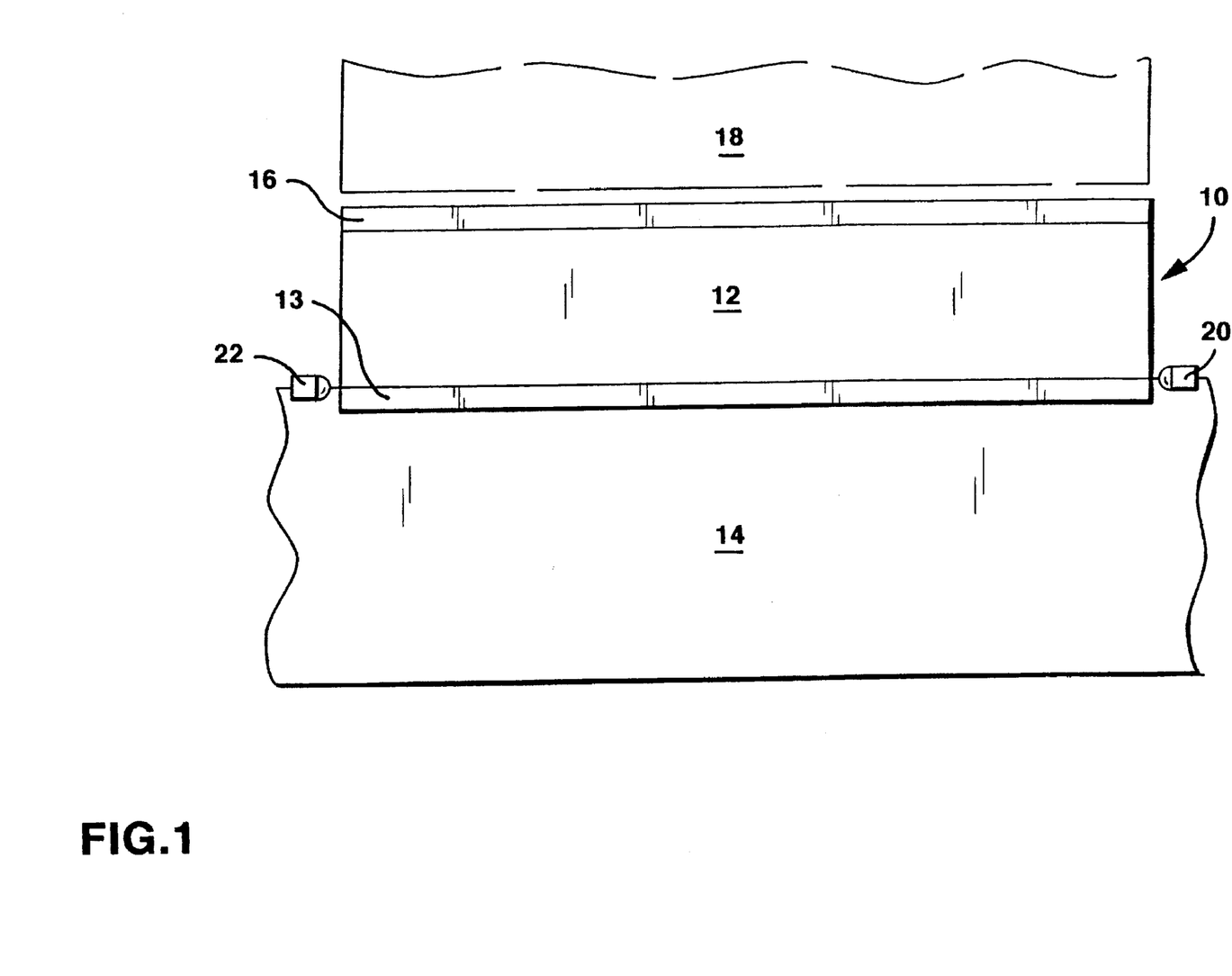
FIG. 1 is a simplified representation of a top view of the apparatus mounted on a dock with the body horizontal, the extension withdrawn under the body, and a trailer alongside shown in dashed outline.
Figure 2:
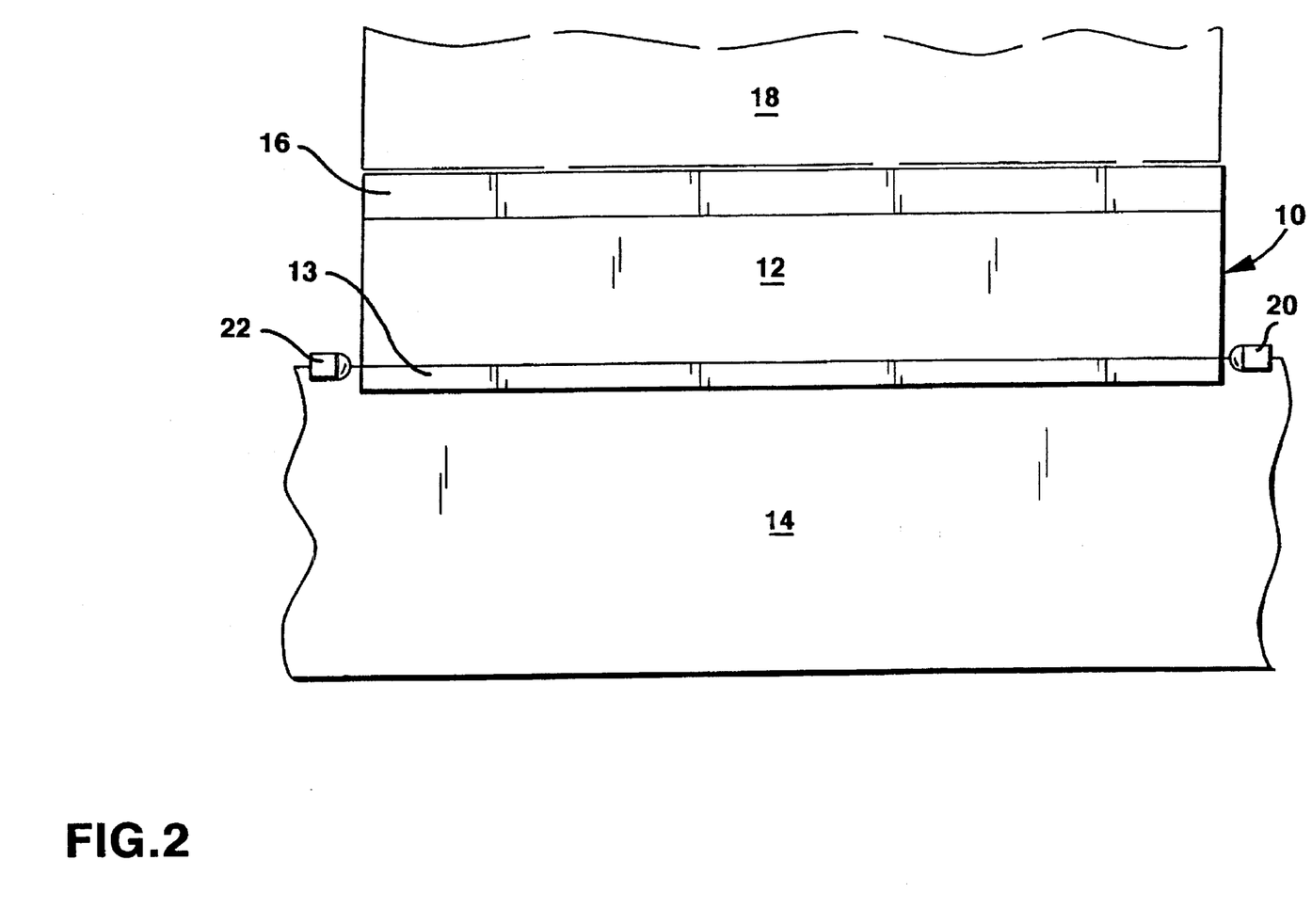
FIG. 2 is the representation of FIG. 1 with the extension extended outward.
Figure 3:
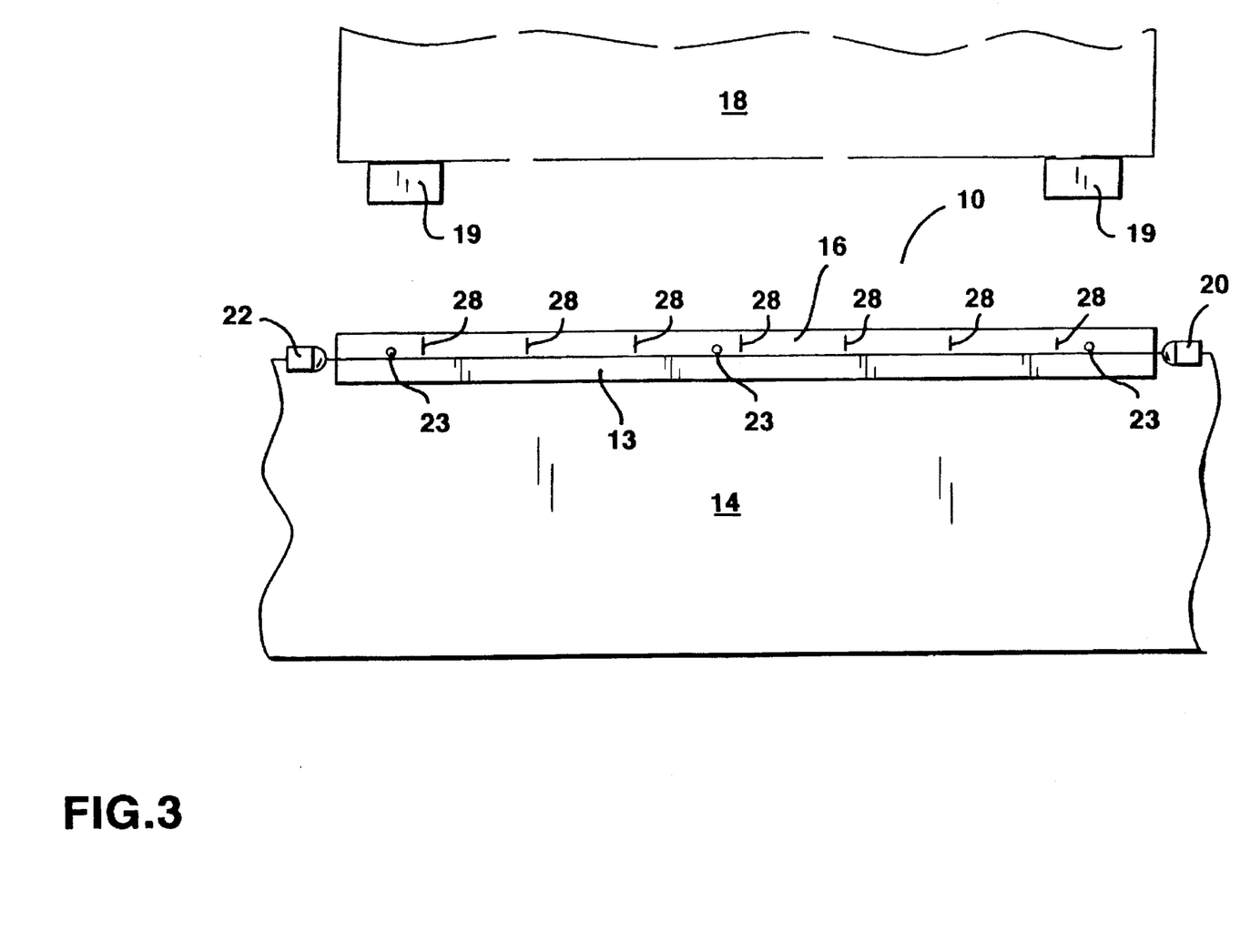
FIG. 3 is the representation of FIG. 1 with the body vertical.
Figure 4:
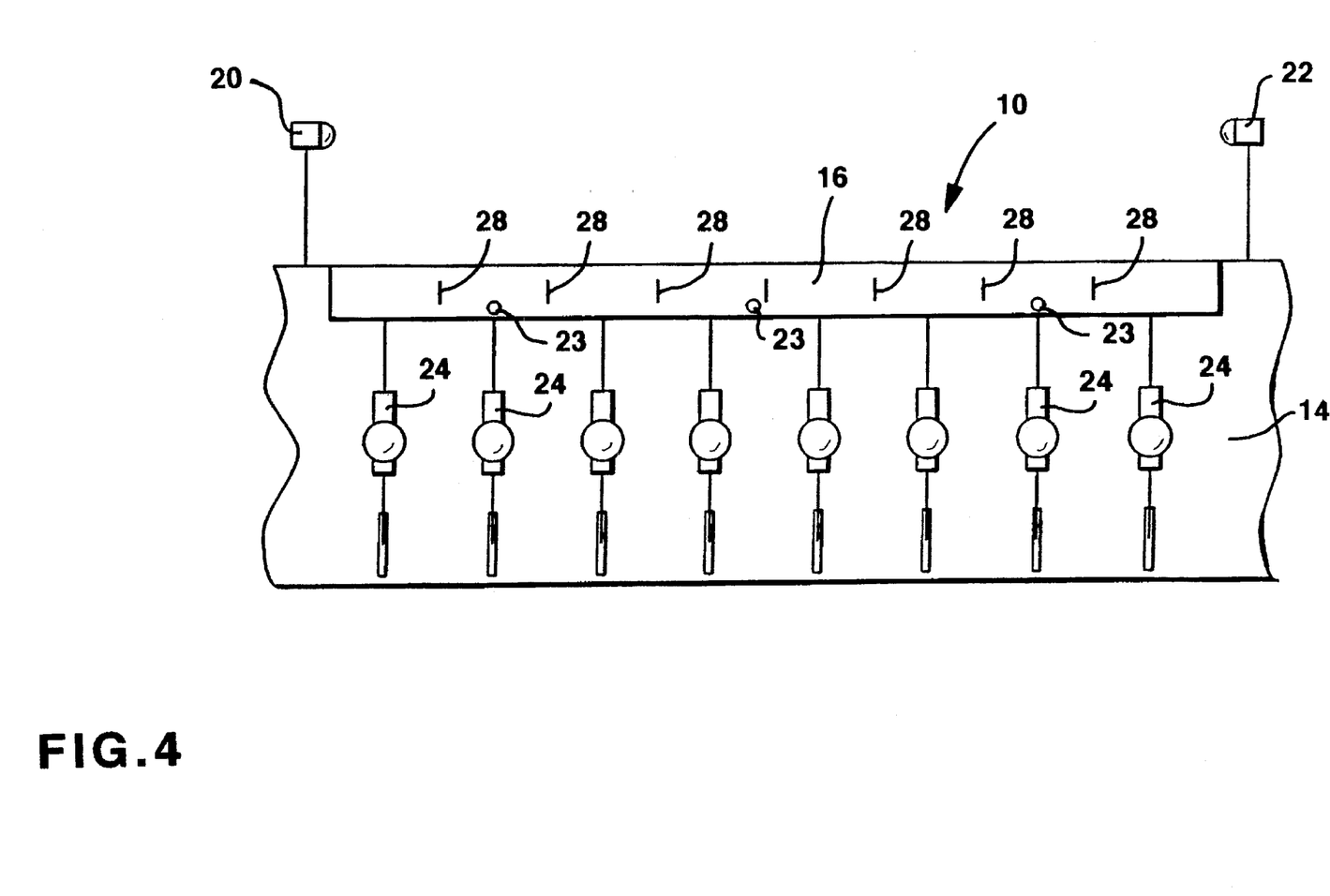
FIG. 4 is a simplified representation of the apparatus of a view from the trailer with the body horizontal.

FIGS. 3 and 5 show body 12 rotated to a vertical orientation by first actuators 24. Actuators 24 are pivotably attached between brackets attached to body 12 and to the side of dock 14. First actuators 24 are selected from the same Duff-Norton 6905 Series but here have a range which will rotate body 12 between vertical, as shown in FIG. 5, and horizontal, as shown in FIG. 4. Eight such first actuators 24 are shown.

Figure 6A:
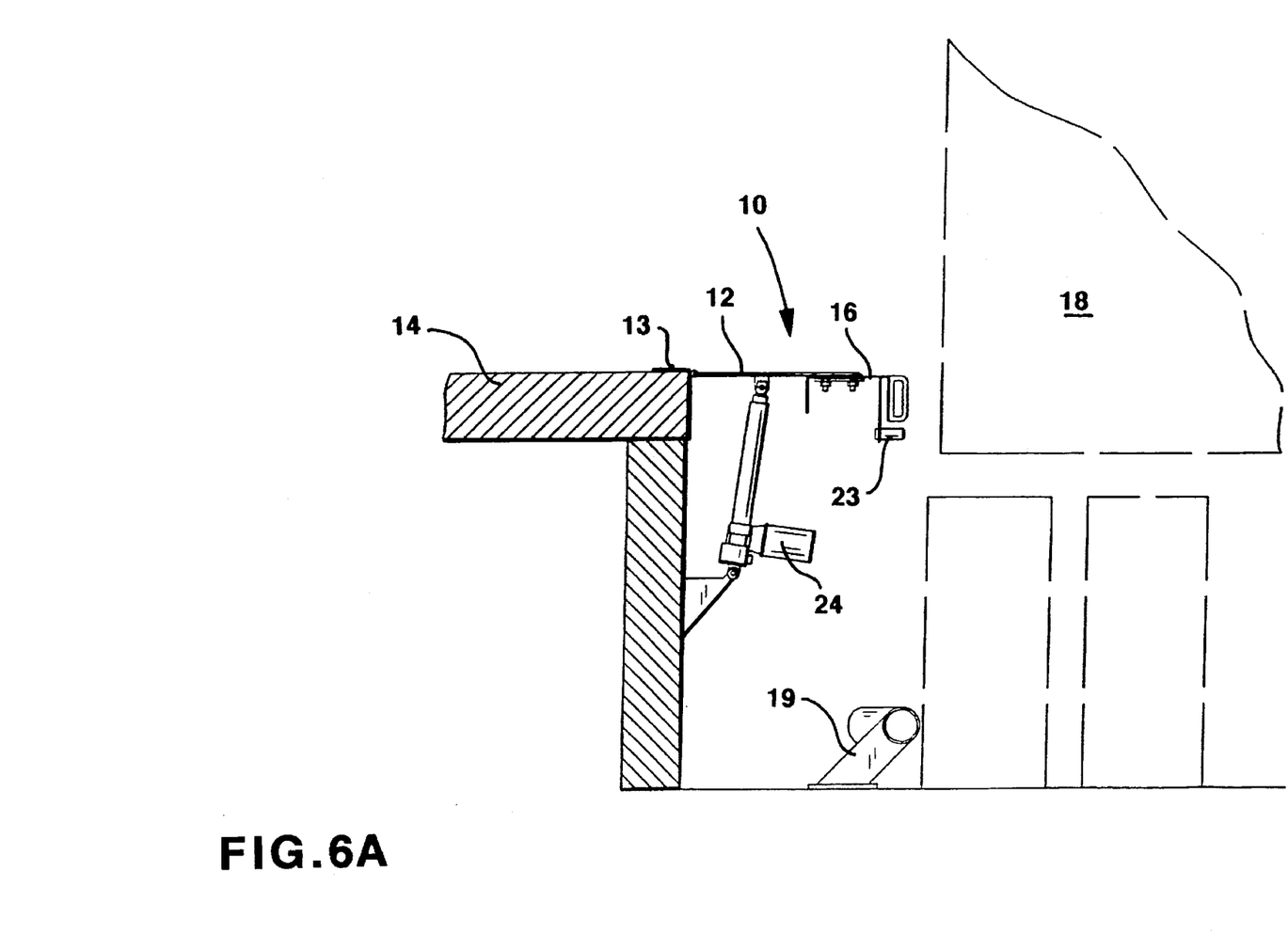
FIG. 6A is the view of FIG. 6 with the body horizontal.

In FIG. 6A inductive sensor 23 is shown adjacent to trailer 18. When extension 16 is moved outward until any one of the three inductive sensors 23 are within a preset distance from trailer 18 when a signal will be generated by that sensor. Inductive sensors 23 can be Turck ac operated inductive sensors which operate at a line frequency between 40 and 60 hertz or an equivalent. These sensors have a sensitivity and are arranged such that when placed within ¼ inch of metal they will generate an output signal. This is arranged to occur when the outside edge of extension 16 is within ¼ inch of trailer 18. The three inductive sensors 23 spaced as shown in FIGS. 3 and 4, control the three groups of bracketing second actuators 26, previously described, such that the central sensor controls the three central second actuators while the opposite end sensors control the respective end pair of second actuators as will be described further later.

Figure 8:
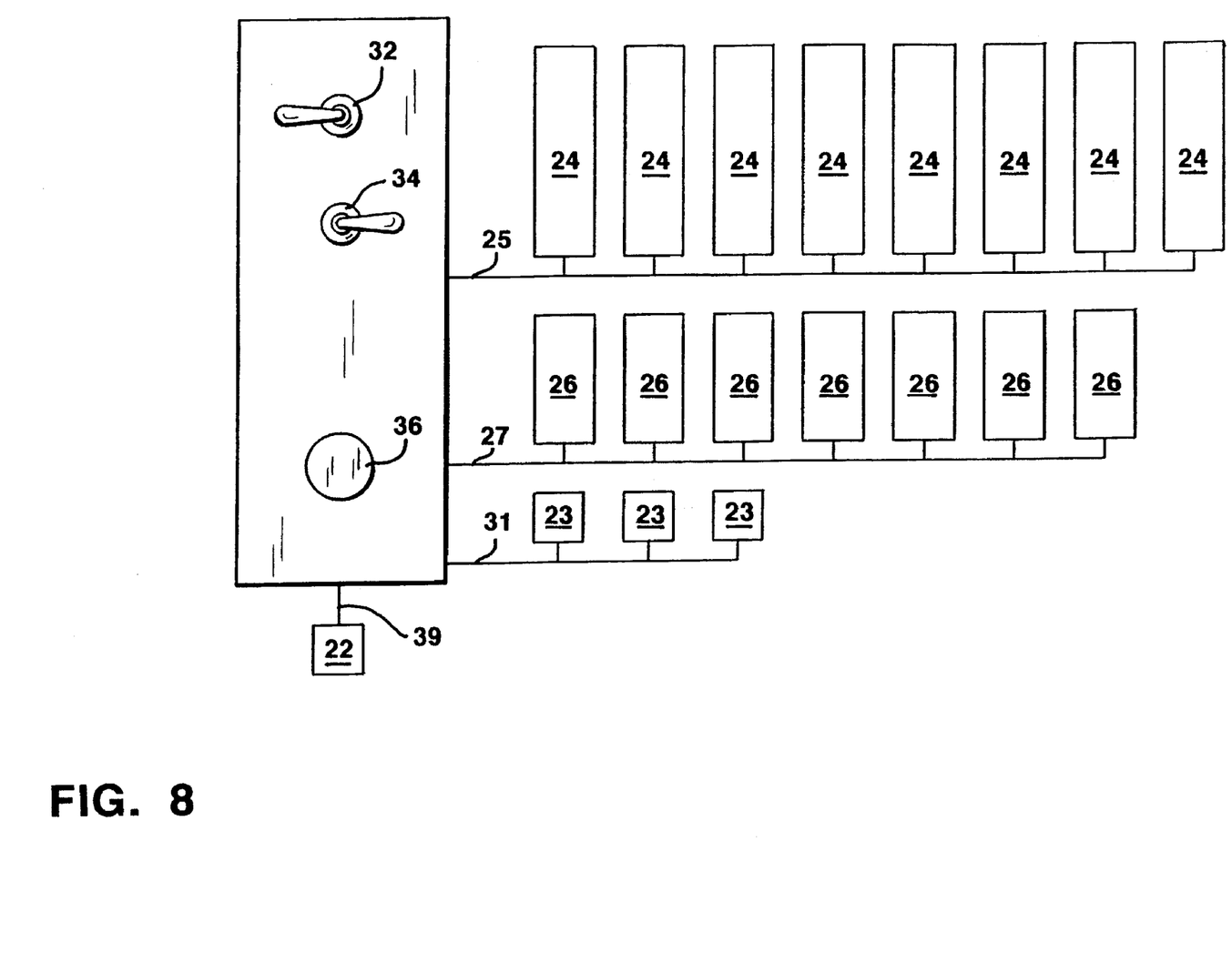
FIG. 8 is a block diagram of the controller and attached electrical equipment.

Controller 30, shown in FIG. 8, is connected to a conventional 110 volt ac power source and provides all of the power and control for apparatus 10. Cables 25 and 27 connects controller 30 to first actuators 24 and second actuators 26 respectively. Cable 31 connects all three inductive sensors to controller 30. Light detector 22 is connected to controller 30 by cable 39.

Controller 30 mounts two three-position center-off toggle switches 32 and 34, and a push button locking switch 36 for operator control. Toggle switch 32 has a position labeled D and a position labeled U. Toggle switch 34 has a position labeled O and a position labeled I. Push button locking switch 36 provides an emergency switch which stops all operations when pushed inward.

The operation explanation starts with body 12 parked before use with extension 16 withdrawn and body 12 in a vertical orientation as shown in FIG. 5. When a trailer 18 is parked with a side parallel to dock 14 and at a predetermined distance using stops 19, as described previously, the operator first moves switch 32 to the D position to initiate the operation. If light detector 22 at this time, or at any subsequent time has an output signal, controller 30 will not provide power to either first actuators 24 or second actuators 26, also if emergency switch 38 is pushed at any time power is interrupted to both sets of actuators by the controller.

From the parked position, if a light detector 22 signal is not present and switch 36 has not been pushed, placing switch 32 in the D, for down position, will cause the rods of first actuators 24 to rotate body 12 from the vertical orientation of FIG. 5 to the horizontal orientation of FIG. 4, where the limit switches of the first actuators will then stop the rotation.

After body 12 has been rotated to the horizontal orientation the operator then places toggle switch 32 in the center-off position and places toggle switch 34 in the O, for out, position. Second switch 34 will then cause second actuators 26 to extend extension 16 from the position shown in FIGS. 1 and 7 to that shown in FIGS. 2 and 7A. Second actuators 26 are wired into three separate groups, two outside groups of two actuators each and a center group of three actuators. Each group of second actuators is controlled by the inductive sensor 23 which they bracket. Each group of second actuators 26 are stopped, but only when extension 16 is moving outward, by the corresponding bracketed inductive sensor 23 providing an output signal corresponding to that part of the extension edge approaching within one fourth of an inch of trailer 18.

If the side of trailer 18 is not absolutely parallel to dock 14 then the inductive sensors 23 will typically provide a signal in sequence from one end to the other as their portion of extension 16 approaches within ¼ inch of trailer 18. Since each inductive sensor 23 controls the bracketing group of second actuators 26, this will result in the group of second actuators on the end of extension 16 nearest trailer 18 stopping before the central group of second actuators, which in turn will stop before the group of actuators on the opposite end of the extension, which results in the edge of the extension being driven essentially parallel with the adjacent side of the trailer.

When all of the inductive sensors 23 output signals have stopped all of their respective bracketing groups of second actuators 26, the operator then returns switch 34 to the center-off position to complete the deployment cycle.

The parking operation begins with apparatus 10 completely deployed, as described above, the operator then places toggle switch 34 in the I, for in, position, this causes second actuators 26 to withdraw extension 16 from trailer 18 under body 16 until the limit switches of the actuators stop the withdrawal with the outer edge of the extension essentially aligned with the outer edge of the body. The operator then returns toggle switch 34 to the center-off position.

The operator then places toggle switch 32 in the U, for up, position which causes actuators 24 to be energized and cause body 12 to rotate from a horizontal orientation to a vertical orientation, which rotation is stopped by the limit switches of the first actuators when the body reaches a vertical position. The operator then places toggle switch 32 in the center-off position to complete the parking cycle.

This relatively simple switch control of the actuators is practical because of the slow motion of the body and extension, which provides adequate time for the operator to respond to any interference with either.

Stops 19, which provide a predetermined location for a trailer 18 parallel to a dock 14, are not essential for the operation of this apparatus. An experienced driver can park the trailer close enough to the dock with the side parallel enough to the dock to permit the apparatus to operate successfully. The addition of stops 19 makes the driver's task much easier however, in that they ensure a predetermined location and orientation of the trailer even when the driver has little experience.

While a particular number of first and second actuators have been illustrated in this embodiment, this number will change depending upon the size and weight of the body and extension, the spacing of the actuators, the length of the dock and the power of the particular actuators selected. Those skilled in the art can readily select an appropriate number, power and range for each by taking these factors into account.

While this invention has been described with respect to a specific embodiment, this description is not intended to be construed in a limiting sense. Various modifications of the illustrative embodiment, as well as other embodiments of the invention, will be apparent to persons skilled in the art upon reference to this description. It is therefore contemplated that the appended claims will cover any such modifications or embodiments as fall within the true scope of the invention.

We claim:

1. Adjustable dock apparatus comprising:
   a) a generally rectangular shaped and essentially planar body having opposed inner and outer edges along the longest dimension thereof, said body having attachment means for pivotally attaching said inner edge of said body to the outer edge of a dock such that said body can rotate between a horizontal orientation extending outward from the dock and a vertical orientation extending upward from the dock; said body also having a plurality of first actuator means for rotating the body between the horizontal orientation and the vertical orientation;
   b) a generally rectangular shaped and essentially planar extension having opposed inner and outer edges along the longest dimension thereof which are essentially the same length as the opposed inner and outer edges of said body, said extension having attachment means for slidable attaching said extension adjacent to said body and coplanar therewith with the outer edge of said extension farthest from the dock and such that said extension can move from a first position, where the outer edge of said extension is essentially aligned with the outer edge of said body, to a second position, where the outer edge of said extension projects outward a predetermined distance beyond the outer edge of said body, said extension also having a plurality of second actuator means for moving said extension between said first position and said second position;
   c. a plurality of inductive sensor means spaced along the outer edge of said extension for sending the presence of a truck trailer at a predetermined distance and generating an output signal; and
   d. said second actuator means having groups of adjacent actuators bracketing each said inductive sensor, with each inductive sensor signal having means for stopping the group of second actuators bracketing said sensor when said extension is moving outwardly with respect to said dock.

2. Apparatus as in claim 1 further comprising:
   a) a light source with a predetermined light path above and across the dock;
   b) light detection means located in said light path for detecting any blockage of the light path and providing an output signal in response thereto; and
   c) means for stopping said first actuator means and said second actuator means in response to said light detection means output signal.

3. Apparatus as in claim 1 further comprising:
   a) said first actuator means having limit switch means for stopping the rotation of said body at a vertical orientation limit and at a horizontal orientation limit; and further having time-out means for deenergizing said first actuator means at a limit after a predetermined length of time; and
   b) said second actuator means having limit switch means for stopping the position of said extension at said first position and at said second position at the limits; and further having time-out means for deenergizing said first actuator means after a predetermined length of time at a limit.

4. Apparatus as in claim 1 wherein said extension attachment means comprises:
   a) a planar plastic sheet of ultra high molecular weight plastic extending across said extension and sandwiched between said body and said extension;
   b) means for securing the body, plastic sheet and extension together, arranged such that said extension can slide between said first and said second position relative to said body over said plastic sheet.

5. Adjustable dock apparatus comprising:
   a) a generally rectangular shaped and essentially planar body having opposed inner and outer edges along the longest dimension thereof, said body having attachment means for pivotally attaching said inner edge of said body to the outer edge of a dock such that said body can rotate between a horizontal orientation extending outward from the dock and a vertical orientation extending upward from the dock; said body also having a plurality of first actuator means for rotating the body between the horizontal orientation and the vertical orientation;
   b) a generally rectangular shaped and essentially planar extension having opposed inner and outer edges along the longest dimension thereof which are essentially the same length as the opposed inner and outer edges of said body, said extension having attachment means for slidable attaching said extension adjacent to said body and coplanar therewith with the outer edge of said extension farthest from the dock and such that said extension can move from a first position, where the outer edge of said extension is essentially aligned with the outer edge of said body, to a second position, where the outer edge of said extension projects outward a predetermined distance beyond the outer edge of said body, said extension also having a plurality of second actuator means for moving said extension between said first position and said second position;
   c) a light source with a predetermined light path above and across the dock;
   d) light detection means located in said light path for detecting any blockage of the light path and providing an output signal in response thereto; and
   e) means for stopping said first actuator means and said second actuator means in response to said light detection means output signal.

6. Adjustable dock apparatus comprising:
   a) a generally rectangular shaped and essentially planar body having opposed inner and outer edges along the longest dimension thereof, said body having attachment means for pivotally attaching said inner edge of said body to the outer edge of a dock such that said body can rotate between a horizontal orientation extending outward from the dock and a vertical orientation extending upward from the dock; said body also having a plurality of first actuator means for rotating the body between the horizontal orientation and the vertical orientation;
   b) a generally rectangular shaped and essentially planar extension having opposed inner and outer edges along the longest dimension thereof which are essentially the same length as the opposed inner and outer edges of said body, said extension having attachment means for slidable attaching said extension adjacent to said body and coplanar therewith with the outer edge of said extension farthest from the dock and such that said extension can move from a first position, where the outer edge of said extension is essentially aligned with the outer edge of said body, to a second position, where the outer edge of said extension projects outward a predetermined distance beyond the outer edge of said body, said extension also having a plurality of second actuator means for moving said extension between said first position and said second position;

c) a planar plastic sheet of ultra high molecular weight plastic extending across said extension and sandwiched between said body and said extension; and d) means for securing the body, plastic sheet and extension together, arranged such that said extension can slide between said first and said second position relative to said body over said plastic sheet.

* * * * *